US012465847B2

(12) United States Patent
Törnqvist

(10) Patent No.: US 12,465,847 B2
(45) Date of Patent: Nov. 11, 2025

(54) METHOD FOR OPERATING A GAMING SYSTEM

(71) Applicant: Play'n Go Marks Ltd, Valletta (MT)

(72) Inventor: Johan Törnqvist, Valletta (MT)

(73) Assignee: Play'n Go Marks Ltd, Valletta (MT)

( * ) Notice: Subject to any disclaimer, the term of this patent is extended or adjusted under 35 U.S.C. 154(b) by 471 days.

(21) Appl. No.: 17/879,898

(22) Filed: Aug. 3, 2022

(65) Prior Publication Data

US 2023/0037355 A1 Feb. 9, 2023

(30) Foreign Application Priority Data

Aug. 4, 2021 (SE) .................................... 2150985-6

(51) Int. Cl.
*A63F 13/355* (2014.01)

(52) U.S. Cl.
CPC .................................. *A63F 13/355* (2014.09)

(58) Field of Classification Search
CPC ..................................................... A63F 13/355
See application file for complete search history.

(56) References Cited

U.S. PATENT DOCUMENTS 9,349,201 B1 5/2016 Gault et al.
2010/0306813 A1* 12/2010 Perry ...................... A63F 13/86 725/114
2014/0108967 A1* 4/2014 Markham ............... A63F 13/42 715/757
2015/0174478 A1 6/2015 Barak
2016/0171828 A1 6/2016 Boudreau et al.
2020/0086213 A1 3/2020 Perry et al.
2021/0093956 A1 4/2021 Cerny et al.
2022/0040573 A1* 2/2022 Fear ...................... A63F 13/493

FOREIGN PATENT DOCUMENTS

EP 3733253 A1 11/2020
WO 2006100664 A2 9/2006

OTHER PUBLICATIONS

Swedish Search Report for SE Application No. 2150985-6 mailed Mar. 28, 2022, 2 pages.
Extended European Search Report dated Nov. 23, 2022 for EP Application No. 22188025.5, 6 pages.

* cited by examiner

*Primary Examiner* — Jasson H Yoo
(74) *Attorney, Agent, or Firm* — RMCK Law Group, PLC

(57) ABSTRACT

The present disclosure generally relates to a computer implemented method for operating a gaming system, and specifically a scheme for allowing an electronic user device to be implemented in a simplified manner, where the electronic user device is configured to interact with a game provided in relation to the gaming system. The present disclosure also relates to a corresponding gaming system and computer program product.

19 Claims, 2 Drawing Sheets

METHOD FOR OPERATING A GAMING SYSTEM

CROSS-REFERENCE TO RELATED APPLICATIONS

This application claims priority to Swedish Patent Application No. 2150985-6, filed on Aug. 4, 2021. The disclosure of the above application is hereby incorporated by reference in its entirety.

TECHNICAL FIELD

The present disclosure generally relates to a computer implemented method for operating a gaming system, and specifically to a scheme for allowing an electronic user device to be implemented in a simplified manner, where the electronic user device is configured to interact with a game provided in relation to the gaming system. The present disclosure also relates to a corresponding gaming system and computer program product.

BACKGROUND

Games of chance are known and widely played for recreational purposes. The gaming industry has come to recognize that to sustain long term success it must be constantly innovative in introducing new games and new gambling concepts to the gaming public. Recently, an increased amount of gaming is involving a gaming software adapted to be executed at an electronic device of an end user, such as at a desktop computer, a tablet, a wearable device or a mobile phone.

However, relying on such an electronic device for successfully operating a modern gaming software has been complex for several reasons. Firstly, e.g., some, lower quality, tablets and mobile phones have generally limited resources available for displaying high resolution visuals, possibly with an in comparison high frame rate. Secondly, new types of electronic user device are constantly being commercialized, meaning that dedicated software, such as a dedicated app for that specific electronic user device, running on the end user's electronic device, constantly needs to be adjusted and updated. Thirdly, with the vastly number of available electronic user devices with different technical specifications it is hard to ensure that all users are provided with the same "high-end user experience" as is generally expected and required by the end users.

Thus, with the above in mind and with an ongoing desire to provide improvements for the end user, it is desirable to, in a gaming environment comprising a gaming system, provide a novel way of distributing a game to the end user's electronic device.

SUMMARY

According to an aspect of the present disclosure, the above is at least partly alleviated by a computer implemented method for operating a gaming system, the gaming system comprising a server and a visualizer provided as an independent hardware module in relation to the server, wherein the server is arranged in network communication with an electronic user device and the method comprises the steps of receiving, at the server from the electronic user device operated by a player, a request to operate at least a portion of a game using the electronic user device, providing, using the server, a first set of game instructions for the game to the visualizer, forming, using the visualizer, a first set of game visuals based on the first set of game instructions, providing, using the server, the first set of game visuals to the electronic user device to enable the player to interact with the game, receiving, at the server, a player interaction from the electronic user device as a response to the first set of game visuals, and providing, using the server, a second set of game visuals to the electronic user device, wherein the second set of game visuals are at least partly dependent on the received player interaction.

By means of the present disclosure, it is provided a scheme allowing for the possibility of reducing the amount of processing that the electronic user device must perform to operate and visualize the game provided within the context of the gaming system. Specifically, rather than having the majority of visual processing being performed by the electronic user device, the present disclosure introduces a so-called visualizer that generally may function to "generate" at least a portion of the visuals for the game, and generated by the server, remotely from the electronic user device.

The visualizer will as such ensure that the user interface portion of the game, herein at least partly referred to as game instructions, are converted or translated to a format that is easily displayed at the electronic user device without the electronic user device having to perform a great deal of processing, for example using the hardware and/or software accelerator provided with the electronic user device. The electronic user device may in the context of the present disclosure be seen as a so-called "thin client" having limited processing capability, at least when compared to the server and/or visualizer. The electronic user device will within the context of the present disclosure render, using embedded hardware and or software graphics accelerator, the first set of game visuals that are formed by the visualizer.

During operation of the electronic user device the user will then act and interact, within a graphical user interface (GUI) provided at a display unit comprised within the electronic user device, based on the first set of game visuals, and provide a reaction/action that is relayed back to the server. The interaction by the player may for example be provided using virtual buttons, text fields, etc., provided within the GUI.

The player interaction will then form part of the gaming system when the visualizer is forming a subsequent (second) set of game visuals that are to be provided to the electronic user device by the server for progressing the game. Further input may of course be provided when forming the second set of game visuals, such as for example an outcome when operating the game. As an example, in some embodiments the player interaction relates to making a bet, operating a button to advance the game, etc.

As will be apparent from the above, the present disclosure ensures that less of the graphical processing is performed at the electronic user device. Consequently, and advantageously, the game may be generally provided to electronic user devices having an in comparison low processing capability, allowing the game to be operated by an increased number of potential players whilst ensuring that the visual is of utmost quality irrelevant of the user device being used. Additionally, the scheme as is provided by means of the present disclosure allows for less general adaptations of the game when new types of electronic user devices are released, reducing the general adaptation need for an operator of the game.

In one embodiment of the present disclosure the sets of game visuals are provided to the electronic user device in an independent form, such as a form that is easily handled by many different types of electronic user devices, both present and future types of electronic user devices. Within the context of the present disclosure, such a device independent form may be a generalized form that can be easily displayed at a display screen of the electronic user device, preferably using a graphics accelerator comprised with the electronic user device.

Different examples of such device independent forms exist, for example by arranging the game visuals in an image or video-based form. When in an image-based form the game visuals may be provided in e.g., a JPEG format. Similarly, when in a video-based form the game visuals may be provided in e.g., a MPEG or Quick Time format. Other formats, relating to either of image or video are possible and within the scope of the present disclosure.

As defined above, the visualizer is provided as an independent hardware module in relation to the server. The visualizer is generally always operating, but the player may optionally select to disable the visualizer. In such a case, the first set of game instructions will be directly provided from the server to the electronic user device. The electronic user device must then be adapted to convert the first set of game instructions to graphical content that allows the player to interact with the game.

By arranging the visualizer as a dedicated hardware module, it may be possible to target the formation of the sets of game visuals in such a manner that the formation process is performed in an efficient manner, based on a selection of components of the hardware module that are specifically adapted for e.g. a specific type of electronic user device that is to receive the game visuals. The game visuals may thus be formed in an optimized compact form that then efficiently may be processed by one or a plurality of processing units comprised with the electronic user device, with the intention to maximize visuals presented at a display screen of the electronic user device while offloading the processing unit(s) of the electronic user device.

In some embodiments the request to play the game may comprise an identity of the player. Different individual players, identified by their identities, may in some embodiments be allowed to have different settings for the visualizer, meaning that the visualizer may be adapted to operate independently for each identified player. Consequently, in some embodiments the identity may comprise a hardware specification relating to the electronic user device. The hardware specification may in turn be used by the visualizer for forming the sets of game visuals.

By arranging the visualizer as a dedicated hardware module external of the server also the server may be offloaded from performing the formation of the game visuals. That is, the server may be arranged in connection with a plurality of different visualizers that each have been optimized for a specific type of electronic user device, i.e. based on the hardware specification relating to the electronic user device. Accordingly, further dedicated hardware module (i.e. additional visualizers) may be added to the gaming system as future types of electronic user device enters the market and are to used for operating the game provided by the gaming system.

The so called "Coral Google Accelerator" is an example of an external module that may be provided for enabling high-speed machine learning to e.g. a PC or Mac, where the Coral Google Accelerator interfaces with the PC or Mac and thereby provides a coprocessor to the system. The Coral Google Accelerator is just provided as an example of an external module, and is in no way selected based on a type of electronic user device that is to receive set of game visuals based on provided sets of game instructions.

Preferably, the sets of game visuals are formed in real time at the visualizer, ensuring that the game content is distributed swiftly to the electronic user device.

The game may preferably be a game of chance, however it may also be possible to allow the game to be a game of skill, where the outcome of the game of skill is determined mainly by mental or physical skill. The concept according to the present disclosure is likewise applicable to either of the types of games.

According to another aspect of the present disclosure there is provided a gaming system, the gaming system comprising a server and a visualizer provided as an independent hardware module in relation to the server, wherein the server is arranged in network communication with an electronic user device and the gaming system is arranged to receive, at the server from the electronic user device operated by a player, a request to operate at least a portion of a game using the electronic user device, provide, using the server, a first set of game instructions for the game to the visualizer, form, using the visualizer, a first set of game visuals based on the first set of game instructions, provide, using the server, the first set of game visuals to the electronic user device to enable the player to interact with the game, receive, at the server, a player interaction from the electronic user device as a response to the first set of game visuals, and provide, using the server, a second set of game visuals to the electronic user device, wherein the second set of game visuals are at least partly dependent on the received player interaction. This aspect of the present disclosure provides similar advantages as discussed above in relation to the previous aspects of the present disclosure.

Preferably, the gaming system is a cloud-based computing system, and the server is a cloud server. Thus, the computing power provided by means of the present disclosure may be distributed between a plurality of servers, and the location of the servers need not be explicitly defined. A further advantage following the use of a cloud-based solution is also the inherent redundancy achieved.

The gaming system preferably comprises the electronic user device. In some embodiments the electronic user device may be selected to include e.g., a computer (laptop/stationary), a mobile phone, a tablet, a (gaming) console, a wearable device or any other gaming device and gambling terminals. The GUI may in some embodiments be allowed to depend on the type of electronic user device utilized by a player.

According to a still further aspect of the present disclosure, there is provided a computer program product comprising a computer readable medium having stored thereon computer program means for operating a gaming system, the gaming system comprising a server and a visualizer provided as an independent hardware module in relation to the server, wherein the server is arranged in network communication with an electronic user device and the computer program product comprises code for receiving, at the server from the electronic user device operated by a player, a request to operate at least a portion of a game using the electronic user device, code for providing, using the server, a first set of game instructions for the game to the visualizer, code for forming, using the visualizer, a first set of game visuals based on the first set of game instructions, code for providing, using the server, the first set of game visuals to the electronic user device to enable the player to interact with the game, code for receiving, at the server, a player interaction from the electronic user device as a response to the first set of game visuals, and code for providing, using the server, a second set of game visuals to the electronic user device, wherein the second set of game visuals are at least partly dependent on the received player interaction. Also this aspect of the present disclosure provides similar advantages as discussed above in relation to the previous aspects of the present disclosure.

The computer program product is typically executed using a computing device comprised within the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
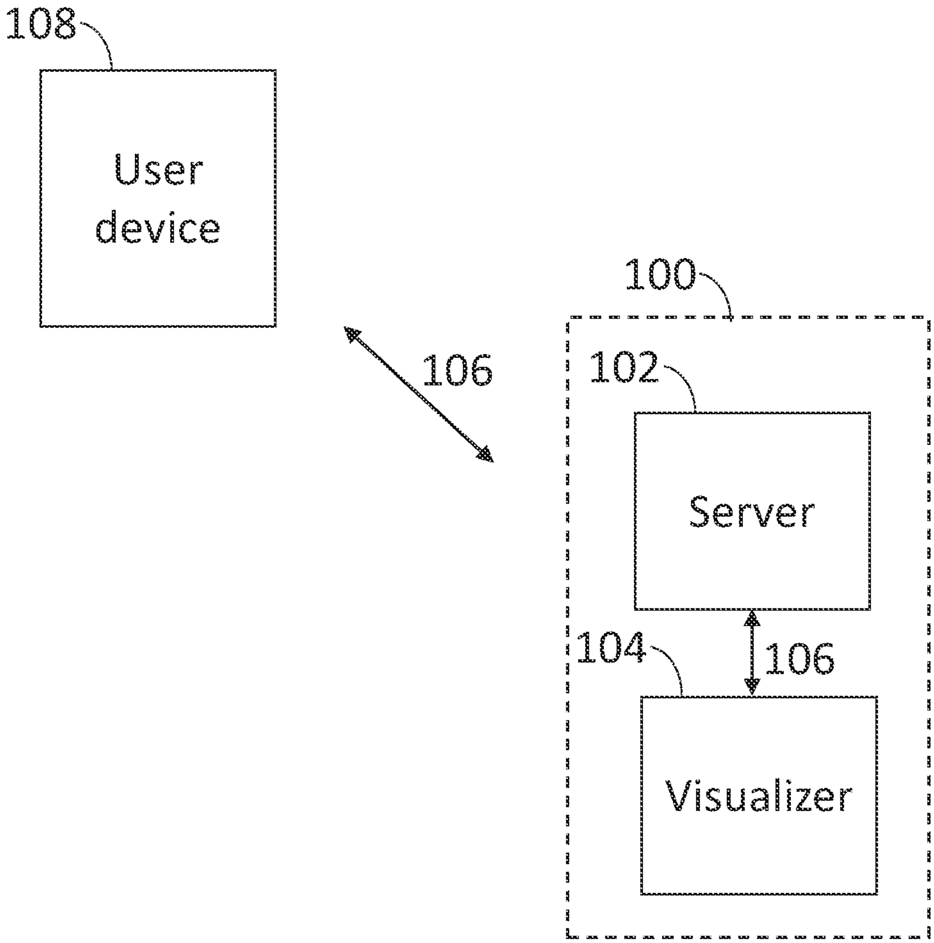
FIG. 1 illustrates a gaming system according to the present disclosure is provided.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Referring now to the drawings and to FIG. 1 in particular, there is depicted a gaming system 100 according to the present disclosure. The gaming system 100 comprises a server 102 and a visualizer 104, where the server 102 and the visualizer 104 are arranged to communicate over a network connection 106, such as using a WAN or a WLAN connection therebetween. The server 102 and the visualizer 104 may also be connected over the Internet.

The gaming system 100 is further connected to an electronic user device 108, such as a mobile phone or a tablet, where the electronic user device comprises a display screen (not shown) adapted to display a graphical user interface (GUI). The connection between the gaming system 100 may in some embodiments be provided using a similar network connection 106 as provided between the server 102 and the visualizer 104, possibly wired but preferably wireless.

Such a wireless network connection may for example be implemented using WLAN, CDMA, GSM, GPRS, 3G mobile communications, 4G mobile communications, 5G mobile communications, or similar. In some embodiments it may be desirable to ensure that the electronic user device 108 is securely connected to the server 102, e.g., using a https communication protocol.

The electronic user device 108 further comprises a user interface to be operated by a player provided with the electronic user device 108. The GUI of the electronic user device 108 is preferably provided for displaying gaming information to the player when the player is interacting with and playing a game, such as to execute actions within the game. The GUI of the electronic user device 108 may for example be provided with virtual buttons and/or text fields to allow the player to relay information back to the server 102.

The electronic user device 108 further comprises a control unit (not explicitly shown), where the control unit is connected to the display and the user interface. For reference, the control unit may be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Even though the server 102 and the visualizer 104 in FIG. 1 are provided as separate hardware entities, they may likewise be implemented as a single component, where possibly the visualizer functionality may be implemented as a software module of the server 102. Conversely, the functionality of the server 102 and the visualizer 104 may be geographically located at different positions, such as possibly within different countries. Such an implementation may have advantages from a legal perspective, e.g., relating to where the game is in fact operated or played. Accordingly, the server 102 may be arranged in a first country, and the visualizer 104 may be provided in a second and different country. The second country may be the same country as where the player is located.

Figure 2:
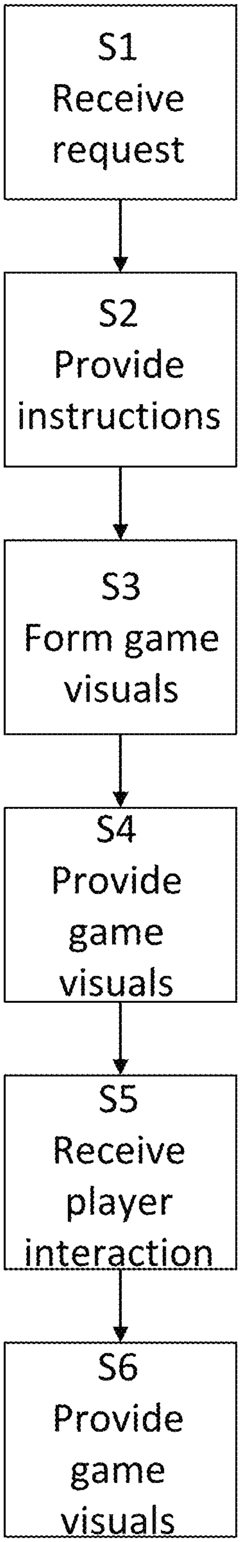
FIG. 2 is a flow chart illustrating the exemplary steps for operating the gaming system as shown in FIG. 1.

During operation of the gaming system 100, with further reference to FIG. 2, the game is initiated when the server 102 receives, S1, a request to operate at least a portion of a game using the electronic user device 108. The server 102 will then provide, S2, a first set of game instructions for the game to the visualizer. The game instructions should conceptually be seen as information that can be used for forming a graphical representation of the game at a display screen of the electronic user device. The game instructions are however generally provided as metadata rather than graphical content. That is, the game instructions are generally "text based" as compared to "image based".

The game instructions are then, once received at the visualizer 104, used by the visualizer to form, S3, a first set of game visuals. The game visuals are, compared to the game instructions, generally "image based" as compared to "text based". It should however be understood that each of the game instructions and the game visuals in part may comprise both image based and text based content.

The server 102 will then provide, S4, the first set of game visuals to the electronic user device 108 to enable the player to interact with the game. The game visuals are here, as elaborated above, generally visualized within a GUI of the electronic user device 108. The visualization of the game visuals may for example be performed using a graphical accelerator provided as a component of the electronic user device 108.

The server 102 will subsequently receive, S5, a player interaction from the electronic user device 108 as a response to the first set of game visuals. The player interaction may for example be provided by the player using virtual buttons, etc. provided within the GUI of the electronic user device 108.

Once the player interaction has been received at the server 102, the server 102 may form and provide, S6, in conjunction with the visualizer 104, a second set of game visuals to the electronic user device 108, where the second set of game visuals are at least partly dependent on the received player interaction. The visualizer 104 will as such function interactively based on the operation of the player. The visualizer 104 will however generally also be provided with further information from the server 102, where such information for example may relate to an outcome of the game provided by the gaming system 100.

In summary, the present disclosure relates to a computer implemented method for operating a gaming system, the gaming system comprising a server and a visualizer, the server and visualizer arranged in network communication with an electronic user device, wherein the method comprises the steps of receiving, at the server from the electronic user device operated by a player, a request to operate at least a portion of a game using the electronic user device, providing, using the server, a first set of game instructions for the game to the visualizer, forming, using the visualizer, a first set of game visuals based on the first set of game instructions, providing, using the server, the first set of game visuals to the electronic user device to enable the player to interact with the game, receiving, at the server, a player interaction from the electronic user device as a response to the first set of game visuals, and providing, using the server, a second set of game visuals to the electronic user device, wherein the second set of game visuals are at least partly dependent on the received player interaction.

Advantages with the present disclosure includes the possibility of reducing the amount of graphical processing that is performed at the electronic user device. Consequently, and advantageously, the game may be provided to electronic user devices having an in comparison low processing capability, allowing the game to be operated by an increased number of potential players. Furthermore, the scheme as is provided by means of the present disclosure allows for less general adaptations of the game when new types of electronic user devices are released, reducing the general adaptation need for an operator of the game, whilst also being able to provide the best quality visuals across a broader range of user devices.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

The invention claimed is:

1. A computer implemented method for operating a gaming system, the gaming system comprising a server and a visualizer configured as an independent hardware module distinct from, and in communication with, the server, wherein the server is arranged in network communication with an electronic user device and the method comprises the steps of:

receiving, at the server from the electronic user device operated by a player, a request to operate at least a portion of a game using the electronic user device, providing, using the server, a first set of game instructions for the game to the visualizer, wherein the first set of game instructions comprises text based metadata, forming, using the visualizer, a first set of game visuals based on the first set of game instructions, wherein the first set of game visuals comprises image based data, providing, using the server, the first set of game visuals to the electronic user device to enable the player to interact with the game, receiving, at the server, a player interaction from the electronic user device as a response to the first set of game visuals, and providing, using the server, a second set of game visuals generated by the visualizer to the electronic user device, wherein the second set of game visuals is at least partly dependent on the received player interaction, wherein the second set of game visuals comprises image based data, wherein the first set of game visuals and the second set of game visuals are provided to the electronic user device in a device independent form.

2. The method according to claim 1, wherein further sets of game visuals, in addition to the first set of game visuals and the second set of game visuals, are provided to the electronic user device to progress the operation of the game.

3. The method according to claim 1, wherein the first set of game visuals and the second set of game visuals are provided to the electronic user device in an image-based form.

4. The method according to claim 1, wherein the first set of game visuals and the second set of game visuals are provided to the electronic user device in a video-based form.

5. The method according to claim 1, wherein the request to operate at least the portion of the game comprises information defining an identity of the player.

6. The method according to claim 5, wherein the request to operate at least the portion of the game further comprises information defining a hardware specification of the electronic user device operated by the player.

7. The method according to claim 6, wherein the formation of the first set of game visuals and the second set of game visuals at the visualizer is dependent on the hardware specification of the electronic user device.

8. The method according to claim 5, wherein the visualizer has a plurality of settings, and wherein the formation of the first set of game visuals and the second set of game visuals at the visualizer is dependent upon a selected setting of the plurality of settings of the visualizer, wherein the selected setting is dependent on the information defining the identity of the player.

9. The method according to claim 1, wherein the first set of game visuals and the second set of game visuals are formed in real time at the visualizer.

10. The method according to claim 1, further comprising providing, using the server, an option to the player to disable the visualizer, wherein disabling the visualizer results in the server providing further sets of game instructions directly to the electronic user device such that the electronic user device forms further sets of game visuals corresponding to the further sets of game instructions without utilizing the visualizer.

11. The method according to claim 1, wherein the request to operate at least the portion of the game comprises information defining a hardware specification of the electronic user device operated by the player.

12. A gaming system, the gaming system comprising a server and a visualizer configured as an independent hardware module distinct from, and in communication with, the server, wherein the server is arranged in network communication with an electronic user device and the gaming system is arranged to:

receive, at the server from the electronic user device operated by a player, a request to operate at least a portion of a game using the electronic user device, provide, using the server, a first set of game instructions for the game to the visualizer, wherein the first set of game instructions comprises text based metadata, form, using the visualizer, a first set of game visuals based on the first set of game instructions, wherein the first set of game visuals comprises image based data, provide, using the server, the first set of game visuals to the electronic user device to enable the player to interact with the game, receive, at the server, a player interaction from the electronic user device as a response to the first set of game visuals, and provide, using the server, a second set of game visuals generated by the visualizer to the electronic user device, wherein the second set of game visuals is at least partly dependent on the received player interaction, wherein the second set of game visuals comprises image based data, wherein the first set of game visuals and the second set of game visuals are provided to the electronic user device in a device independent form.

13. The gaming system according to claim 12, wherein further sets of game visuals, in addition to the first set of game visuals and the second set of game visuals, are provided to the electronic user device to progress the operation of the game.

14. The gaming system according to claim 12, wherein the first set of game visuals and the second set of game visuals are provided to the electronic user device in an image-based form.

15. The gaming system according to claim 12, wherein the first set of game visuals and the second set of game visuals are provided to the electronic user device in a video-based form.

16. The gaming system according to claim 12, further comprising the electronic user device.

17. The gaming system according to claim 12, wherein the gaming system is arranged to provide, using the server, an option to the player to disable the visualizer, wherein disabling the visualizer results in the server providing further sets of game instructions directly to the electronic user device such that the electronic user device forms further sets of game visuals corresponding to the further sets of game instructions without utilizing the visualizer.

18. A computer program product comprising a non-transitory computer readable medium having stored thereon a computer program for operating a gaming system when the computer program is executed by the gaming system, the gaming system comprising the server and a visualizer configured as an independent hardware module distinct from, and in communication with, the server, wherein the server is arranged in network communication with an electronic user device and the computer program product comprises:

code for receiving, at the server executing the computer program and from the electronic user device operated by a player, a request to operate at least a portion of a game using the electronic user device, code for providing, using the server, a first set of game instructions for the game to the visualizer, wherein the first set of game instructions comprises text based metadata, code for forming, by the visualizer in response to the first set of game instructions received from the server, a first set of game visuals based on the first set of game instructions, wherein the first set of game visuals comprises image based data, code for providing, using the server, the first set of game visuals to the electronic user device to enable the player to interact with the game, code for receiving, at the server, a player interaction from the electronic user device as a response to the first set of game visuals, and code for providing, using the server, a second set of game visuals to the electronic user device, wherein the second set of game visuals is at least partly dependent on the received player interaction, wherein the second set of game visuals comprises image based data, wherein the first set of game visuals and the second set of game visuals are provided to the electronic user device in a device independent form.

19. The computer program product of claim 18, further comprising code for providing, using the server, an option to the player to disable the visualizer, wherein disabling the visualizer results in the server providing further sets of game instructions directly to the electronic user device such that the electronic user device forms further sets of game visuals corresponding to the further sets of game instructions without utilizing the visualizer.

* * * * *